(12) United States Patent
Huha et al.

(10) Patent No.: US 6,927,951 B2
(45) Date of Patent: Aug. 9, 2005

(54) FLEX ON SUSPENSION WITH DISSIPATIVE POLYMER SUBSTRATE ACTING AS BLEED RESISTOR FOR MINIMIZING ESD DAMAGE

(75) Inventors: Marsha Huha, Minneapolis, MN (US); Kevin Schulz, Apple Valley, MN (US); Werner Weidemann, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 101 days.

(21) Appl. No.: 10/115,174

(22) Filed: Apr. 2, 2002

(65) Prior Publication Data

US 2002/0154454 A1 Oct. 24, 2002

Related U.S. Application Data

(63) Continuation-in-part of application No. 09/824,528, filed on Apr. 2, 2001, now Pat. No. 6,728,082.
(60) Provisional application No. 60/284,734, filed on Apr. 18, 2001, and provisional application No. 60/274,841, filed on Mar. 9, 2001.

(51) Int. Cl.[7] ............................. G11B 5/39; G11B 5/40; G11B 5/48
(52) U.S. Cl. ..................... 360/323; 360/128; 360/245.9
(58) Field of Search ............................. 360/323, 245.8, 360/245.9, 128

(56) References Cited

U.S. PATENT DOCUMENTS

| | | | |
|---|---|---|---|
| 5,559,051 A | 9/1996 | Voldman et al. | 437/51 |
| 5,644,454 A | 7/1997 | Arya et al. | 360/106 |
| 5,710,682 A | 1/1998 | Arya et al. | 360/106 |
| 5,712,747 A | 1/1998 | Voldman et al. | 360/103 |
| 5,748,412 A | 5/1998 | Murdock et al. | 360/113 |
| 5,757,590 A | 5/1998 | Phipps et al. | 360/113 |
| 5,757,591 A | 5/1998 | Carr et al. | 360/113 |
| 5,777,829 A | 7/1998 | Voldman et al. | 360/128 |
| 5,812,357 A | 9/1998 | Johansen et al. | 361/212 |
| 5,877,933 A | 3/1999 | Johansen et al. | 361/220 |
| 5,903,418 A | 5/1999 | Boivin et al. | 361/22 |
| 5,963,415 A | 10/1999 | Johansen | 361/212 |
| 5,978,177 A * | 11/1999 | Takasugi | 360/245.9 |
| 6,034,851 A | 3/2000 | Zarouri et al. | 360/137 |
| 6,054,330 A | 4/2000 | Phipps et al. | 438/3 |
| 6,081,409 A | 6/2000 | Hughbanks et al. | 360/128 |
| 6,104,048 A | 8/2000 | Wang et al. | 257/272 |
| 6,125,015 A | 9/2000 | Carlson et al. | 360/245.9 |
| 6,146,813 A | 11/2000 | Girard et al. | 430/319 |
| 6,373,660 B1 * | 4/2002 | Lam et al. | 360/245.8 |
| 6,459,043 B1 * | 10/2002 | Dodsworth | 360/245.9 |
| 6,631,052 B1 * | 10/2003 | Girard et al. | 360/323 |
| 6,687,097 B1 * | 2/2004 | Anderson et al. | 360/323 |

* cited by examiner

Primary Examiner—Craig A. Renner
(74) Attorney, Agent, or Firm—Brendan J. Hanley

(57) ABSTRACT

A head gimbal assembly that includes a bleed resistor applied over a specified area of the reader, writer and ground leads in order to protect from ESD damage is disclosed. The present invention address the need for an ESD protection system that includes a consistent and secure connection with leads, that does not contaminate the drive environment and applies a consistent resistivity to both the reader and writer element by providing a head gimbal assembly with strategically placed bleed resistors that will protect the read element from transient charge produced any time during the fabrication, assembly, testing and shipment of the disc drive.

10 Claims, 12 Drawing Sheets

FLEX ON SUSPENSION WITH DISSIPATIVE POLYMER SUBSTRATE ACTING AS BLEED RESISTOR FOR MINIMIZING ESD DAMAGE

CROSS-REFERENCE TO RELATED APPLICATION

The present application is based on and claims the benefit of U.S. provisional patent application Ser. No. 60/284,734, filed Apr. 18, 2001, and is a continuation-in-part of U.S. patent application Ser. No. 09/824,528, filed Apr. 2, 2001, by Tabat et al, entitled "MAGNETIC TRANSDUCER WITH INTEGRATED CHARGE BLEED RESISTOR," now U.S. Pat. No. 6,728,082, patented Apr. 27, 2004, the content of which is hereby incorporated by reference in its entirety.

FIELD OF THE INVENTION

The present invention relates to electrostatic device protection on head gimbal assemblies. In particular, the present invention relates to an apparatus for reducing charge build-up on a transducer.

BACKGROUND OF THE INVENTION

Disc drives are the primary devices employed for mass storage of computer programs and data. Disc drives typically use rigid discs, which are coated with a magnetizable medium to form a recording layer in which data can be stored in a plurality of circular, concentric data tracks. Typical read/write heads include separate read and write head portions. One advantage to this configuration is that the read and write heads can be optimized for the particular task they perform.

The read head typically includes a magnetoresistive or giant magnetoresistive read element that is adapted to read magnetic flux transitions recorded to the tracks which represent the bits of data. The magnetic flux from the disc surface causes a change in the electrical resistivity of the read element, which can be detected by passing a sense current through the read element and measuring a voltage across the read element. The voltage measurement can be detected to determine the recorded data.

The write head includes an inductive recording element for generating a magnetic field that aligns the magnetic moments of the recording layer to represent the desired bits of data. Magnetic recording techniques include both longitudinal and perpendicular recording. Perpendicular recording is a form of magnetic recording which orients magnetic moments representing bits of data perpendicularly to the surface of the recording layer of the recording medium, as opposed to longitudinally along a track of the medium as in the more traditional longitudinal recording technique. Perpendicular recording offers advantages over longitudinal recording, such as significantly higher areal density recording capability.

Typically, the reader element is formed or fabricated as part of a wafer which is severed into a plurality of sliders. A magnetic writer is also integrated with the sensor during wafer fabrication. The slider carries reader elements and writer elements adjacent to the surface of the magnetic storage medium. The reader element and the writer are called the transducer, and the combination of the transducer and slider constitute what is called a magnetoresistive head. The slider of the magnetoresistive head is supported above the magnetic storage medium by the gimbal and the tongue of the load beam.

The head gimbal assembly may include a flex on suspension (FOS), a load beam, a mounting plate, a gimbal and the magnetoresistive head. The FOS extends from an actuator to a portion of the mounting plate, and is connected to the load beam. The load beam is also connected to the mounting plate. At the end of the FOS, the gimbal is connected to, and extends from, the FOS. Lastly, the gimbal is preferably coupled to the slider of the magnetoresistive head. The support arm, load beam and gimbal support and carry the magnetoresistive head adjacent a magnetic storage medium such as a magnetic disc.

The first and second electrical conductors electrically connecting the transducer and the detection circuitry typically comprise transducer leads and bonding pads. The transducer leads extend along a surface of the slider, are electrically connected to the bonding pads, and the bonding pads are connected to the transducer. The bonding pads provide a surface by which electrical conductors such as wire may be attached to electrically connected to the magnetoresistive head. The transducer leads further extend along the gimbal and the FOS to the detection circuitry. These leads can be carried on a flexible carrier substrate, such as polyimide.

Large currents or voltages associated with the charging or discharging of the transducer by electrostatic charge sources may possibly damage the reader element. Electrostatic charge may be generated any time during the fabrication, assembly, testing and shipment of the disc drive. Specifically, electrostatic charge may be generated during fabrication of the magnetoresistive head assembly, the head gimbal assembly, the E-block assembly, the final disc drive, electrical testing of components and shipment of the components. In response, various procedures and equipment have been installed to control electrostatic discharge (ESD) levels during every stage of handling through final disc drive assembly to prevent damage to the reader element caused by ESD. However, there are unique breakdown mechanisms associated with charge on the writer element of a transducer, which conventional ESD devices do not address. For instance, the sudden discharge of a writer terminal can generate damaging, transient currents through the reader element due to the capacitive and inductive coupling present between reader and writer. Additionally, it is likely that the use of bleed resistors connected only to the reader, shields and poles, when not paired with similar resistors connected to the writer coil, increase the risk of a particular transducer breakdown mechanism. If all terminals of a head are subjected to a charge source, the bleed resistors dissipate the charge only from the reader, shield and poles, and a voltage will be generated between the coils and poles that can cause failure. Thus there is a need for an ESD device that safeguards the recording head from sources subjecting both the reader and the writer to charging. The present invention addresses this need with the integration of writer bleed resistors, which effectively eliminate this failure mechanism.

Various means of reducing the risk of ESD damage to the reader exist. For example, in the field of FOS technology, the flex and covercoat material have been shown to highly tribochargable and thus a potential source for ESD damage to recording heads. Some prior systems have tried to minimize ESD by plating or covering the FOS with an intrinsically conductive polymer to minimize or eliminate potential charge-up of the FOS. However such systems are undesirable because there is a lack of contact between the conductive polymer and the electrical leads to the transducer. Other attempts to prevent ESD damage include applying anti-static coatings on the FOS, which lowers the surface resistivity.

These coatings contaminate the drive environment and are therefore not desirable. Other techniques, such as a shunt clip or incorporating a diode on the suspension assembly for shunting, are not desirable to protect against ESD. The shunt clip and diode on the suspension assembly may not protect the reader element from ESD damage due to an inconsistent shunt and neglecting discharge from the writer element.

Therefore, there is a need for an ESD protection system that provides a consistent and secure connection with the transducer leads, that does not contaminate the drive environment and applies consistent resistivity to both the reader element and the writer element.

The present invention addresses these and other needs, and offers other advantages over current systems.

SUMMARY OF THE INVENTION

The present invention provides a head gimbal assembly that includes a dissipative resistor applied over a specified area of the reader, writer and ground leads in order to protect from ESD damage. The head gimbal assembly of the present invention includes a FOS, a mounting plate, a load beam, a gimbal, a magnetoresistive head and a breakaway tab. The transducer includes a reader and a writer element. The FOS extends from an actuator to a portion of the mounting plate, and is connected to the load beam. The load beam is also connected to the mounting plate. At the end of the FOS, the gimbal is connected to, and extends from, the FOS. The transducer leads extend from the FOS, gimbal and to the transducer. The transducer leads include leads to the writer, reader and ground. A polymer resistor of suitable known construction is applied over the transducer leads or is used as the substrate of the FOS. Alternatively, an intrinsically conductive polymer resistor of suitable known construction is applied over the transducer leads, and a covercoat of suitable known construction is applied to the conductive polymer. The polymer resistor ties all the leads together at the same resistance and maintains a stable potential across the leads which satisfies the need in the art to provide a consistent and secure protection from ESD. The potential for ESD damage is minimized as charges, built up from FOS handling, drain at a controlled rate from the reader and writer leads through the bleed resistor to the ground lead. This allows for the bleed off of triboelectric charge during drive build, testing and handling and by protecting against both reader and writer discharge induced damage to the reader. The use of polymer bleed resistors safeguards the head gimbal assembly during manufacturing and supplies a clean way to mount a resistor on the FOS between transducer leads.

In an alternative embodiment, the head gimbal assembly includes a FOS, a mounting plate, a load beam, a gimbal, a magnetoresistive head and a breakaway tab. The transducer includes a reader and a writer element. The FOS extends from an actuator to a portion of the mounting plate, and is connected to the load beam. The load beam is also connected to the mounting plate. At the end of the FOS, the gimbal is connected to, and extends from, the FOS. The transducer leads extend from the FOS, gimbal and to the transducer. The transducer leads include leads to the writer, reader and ground. A discrete resistor is connected to the transducer leads on the breakaway tab on the FOS thereby providing protection from potential ESD damage by draining built up charge to ground. Alternatively, a discrete resistor is connected to the transducer leads on the FOS near the load beam and a bond pad, wherein the bond pad is connected to the load beam, and the load beam is connected to ground.

In another alternative embodiment, the head gimbal assembly includes a FOS, a mounting plate, a load beam, a gimbal, a magnetoresistive head and a breakaway tab. The magnetoresistive head includes a slider and a transducer. The transducer includes a reader, a writer element, various shields and poles, and a via. The via is electrically connects the transducer to the slider, and the slider is connected to the load beam, and the load beam is connected to ground. The FOS extends from an actuator to a portion of the mounting plate, and is connected to the load beam. The load beam is also connected to the mounting plate. At the end of the FOS, the gimbal is connected to, and extends from, the FOS. The gimbal and a portion of the load beam are connected to the magnetoresistive head. The transducer leads extend from the FOS, gimbal, magnetoresistive head and to the transducer. At least one resistor is connected in between the slider and write element and the slider and the read element. Additionally, another bleed resistor may be connected between the slider and write element and the slider and the read element. Also, a resistor is connected between the shield and the slider, the slider is connected to the load beam, and the load beam is connected to ground.

These and various other features as well as advantages which characterize the present invention should be apparent to those skilled in the art upon reading the following detailed description and review of the associated drawings.

DETAILED DESCRIPTION

Figure 1:
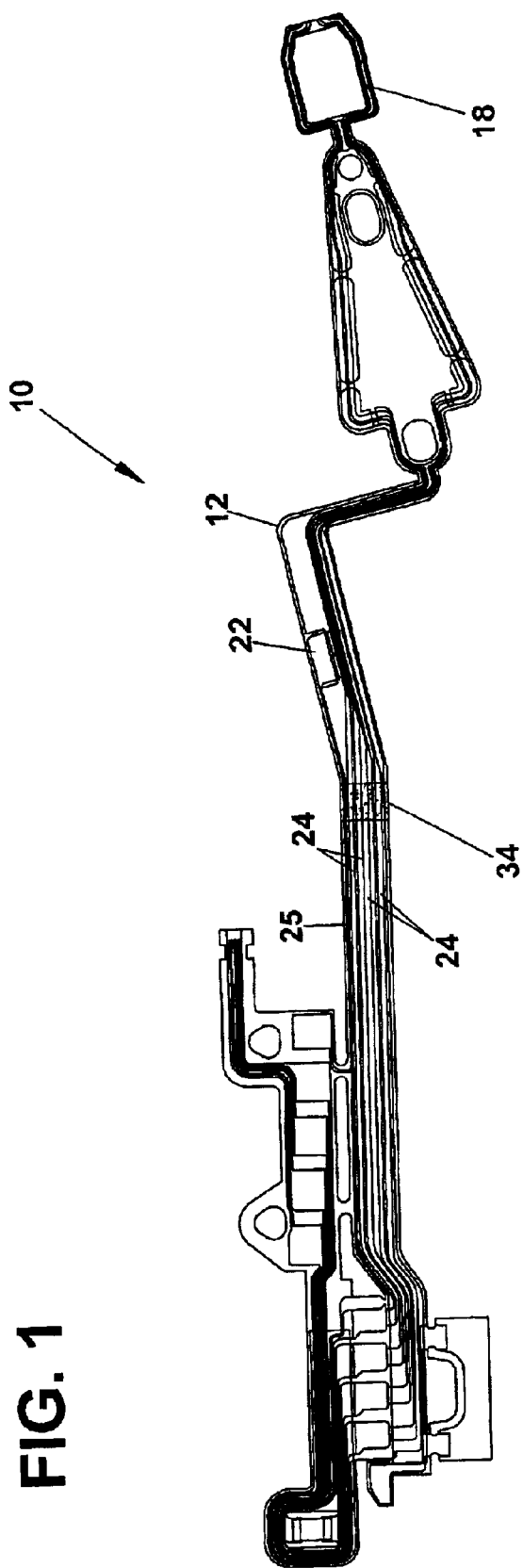
FIG. 1 is a top plan view of a bleed resistor applied over a specific area of the reader, writer and ground lead according to the present invention.
Figure 2:
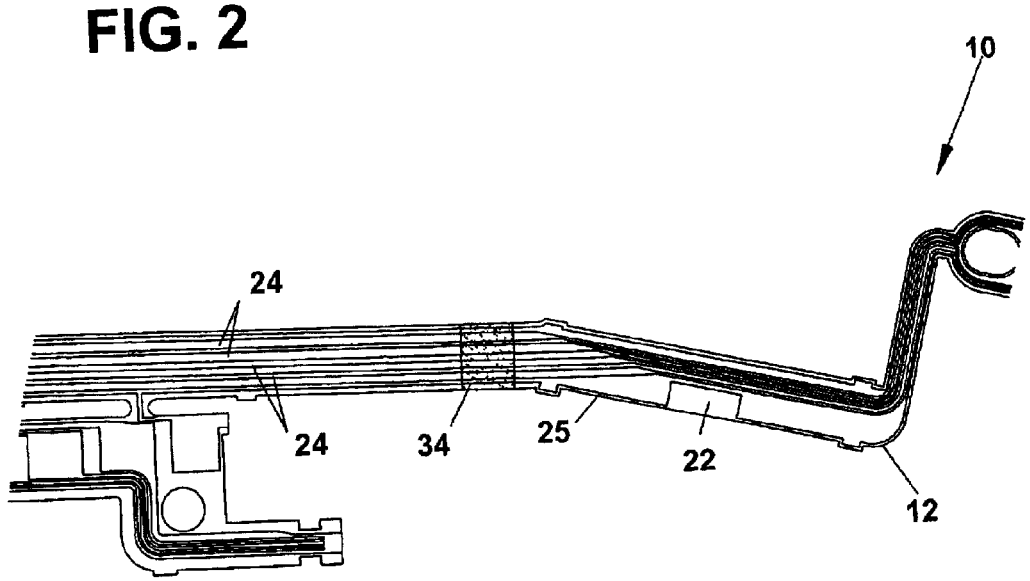
FIG. 2 is an enlarged top plan view of the type shown in FIG. 1.
Figure 3:
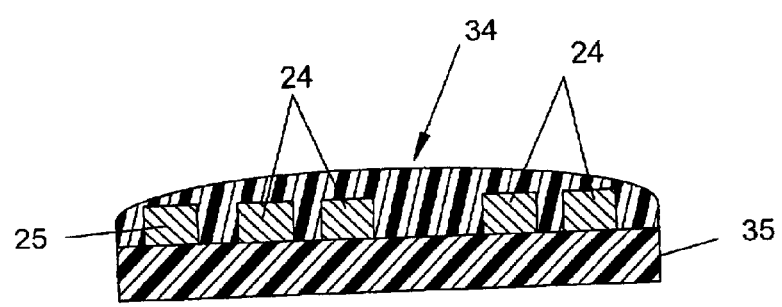
FIG. 3 is an enlarged cross-sectional view of a bleed resistor over the transducer leads of the type shown in FIG. 1.
Figure 4:
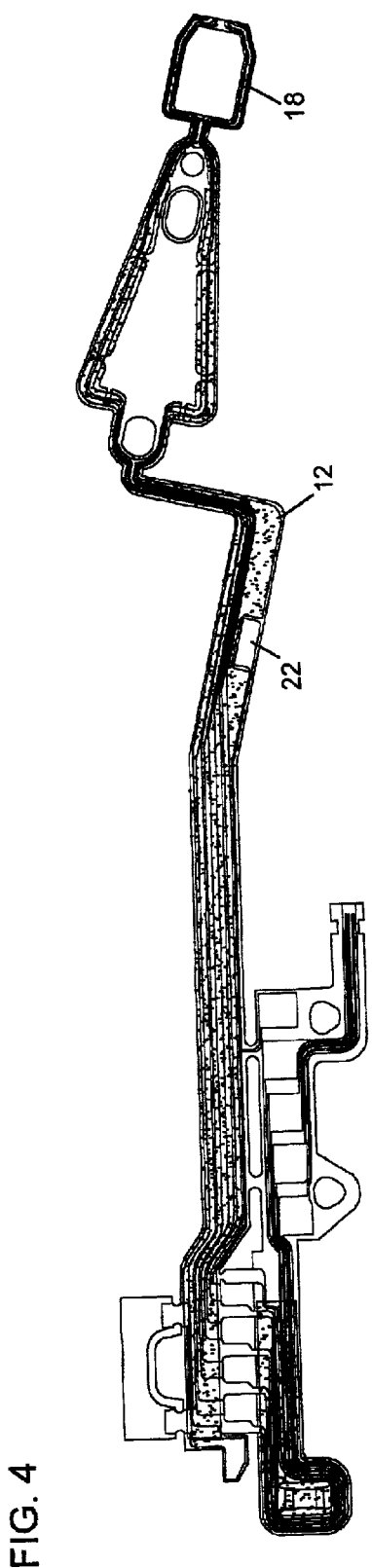
FIG. 4 is a top plan view of a bleed resistor applied over the entire length of the transducer lead of the type shown in FIG. 1.
Figure 5:
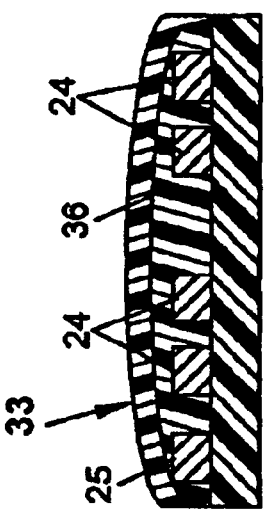
FIG. 5 is an enlarged cross-sectional view of a bleed resistor substrate of the type shown in FIG. 1.

FIGS. 1–6 illustrate the head gimbal assembly 10 according to the present invention. FIG. 1 is a top plan view of a head gimbal assembly 10 including a flex on suspension (FOS) 12 and a gimbal 18, wherein a dissipative polymer covercoat 34 of suitable known construction has been screened over a specified area of the transducer leads 24 and ground lead 25. FIG. 2 is an enlarged perspective top plan view, and FIG. 3 a cross-sectional view, of a head gimbal assembly 10. The dissipative covercoat 34 has been screened onto the transducer leads 24 and ground lead 25 over a window in the dissipative covercoat 34, thereby allowing a tight tolerance on resistance as it is more robust in thickness than in area. The application of the dissipative covercoat 34 over the FOS 12, transducer leads 24, and ground lead 25 is more easily assembled than other potential ESD solutions, because its application step is similar to a conventional covercoat by using a thermal cure instead of a UV cure. Charge built up by handling or testing the head gimbal assembly 10 is dissipated through the dissipative covercoat to the ground lead 25. The ground lead 25 is connected to ground at the tail tack 22 by a conductive adhesive. The dissipative covercoat 34 is applied onto all the transducer leads 24, which provides a discharge path from both the reader and writer leads, thus protecting the reader element against induced current from a reader or writer element discharge. The dissipative covercoat 34 should have a resistance in the range of 220 kΩ to 10 MΩ. The resistance of dissipative covercoat 34 is based on area, thickness and concentration of the dissipative covercoat 34. Alternatively, the dissipative polymer covercoat 34 is applied to the entire length of the FOS 12 and transducer leads 24 and ground lead 25, as shown in FIG. 4. This provides for ESD protection to the entire substrate 35 and length of the transducer leads 24 and ground lead 25 by bleeding off the charge at a controlled rate. Further, a dissipative substrate 37 is used on the FOS to bleed charge built up on the leads 24 and 25, as shown in FIG. 5. In this embodiment, a dissipative polymer substrate 37 of suitable known construction is used as a substrate for the FOS 12 and is in direct contract with the transducer leads 24 and ground lead 25. Dissipative substrate 37 may be composed of, but is not limited to, polyimide. Dissipative substrate 37 is beneficial in that it does not allow the FOS 12 to tribocharge as well as allowing the bleed off of any charge built up on the leads.

Figure 6:
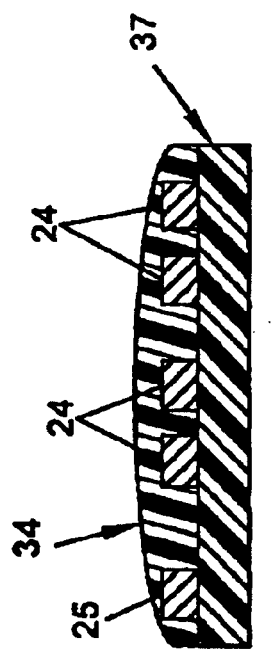
FIG. 6 is an enlarged cross-sectional view of transducer leads covered by a intrinsically conductive polymer, and a non-conductive covercoat applied over the intrinsically conductive polymer, of the type shown in FIG. 1.

FIG. 6 illustrates a different resistive system that would be implemented similar to FIG. 3. A conventional intrinsically conductive polymer 36 is screened over the transducer leads 24 and ground lead 25, and non-conductive covercoat 33 is screened over the conductive polymer 36. Charge built up by handling or testing is dissipated through the conductive polymer 36 to the ground lead 25. The ground lead 25 is connected to ground at the tail tack 22 by a conductive adhesive, which measures in the range of less than 1 MΩ. The conductive polymer 36 is applied onto all the transducer leads 24 and ground lead 25, which provides a discharge path from both the reader and writer leads, thus protecting the reader element against induced current from a reader or writer element discharge. The conductive polymer 36 can be from any of the families of conductive polymers, such as pyrrole, thiophene and furan. The resistance of conductive polymer 36 is based on area, thickness and concentration of the conductive polymer 36.

Figure 7:
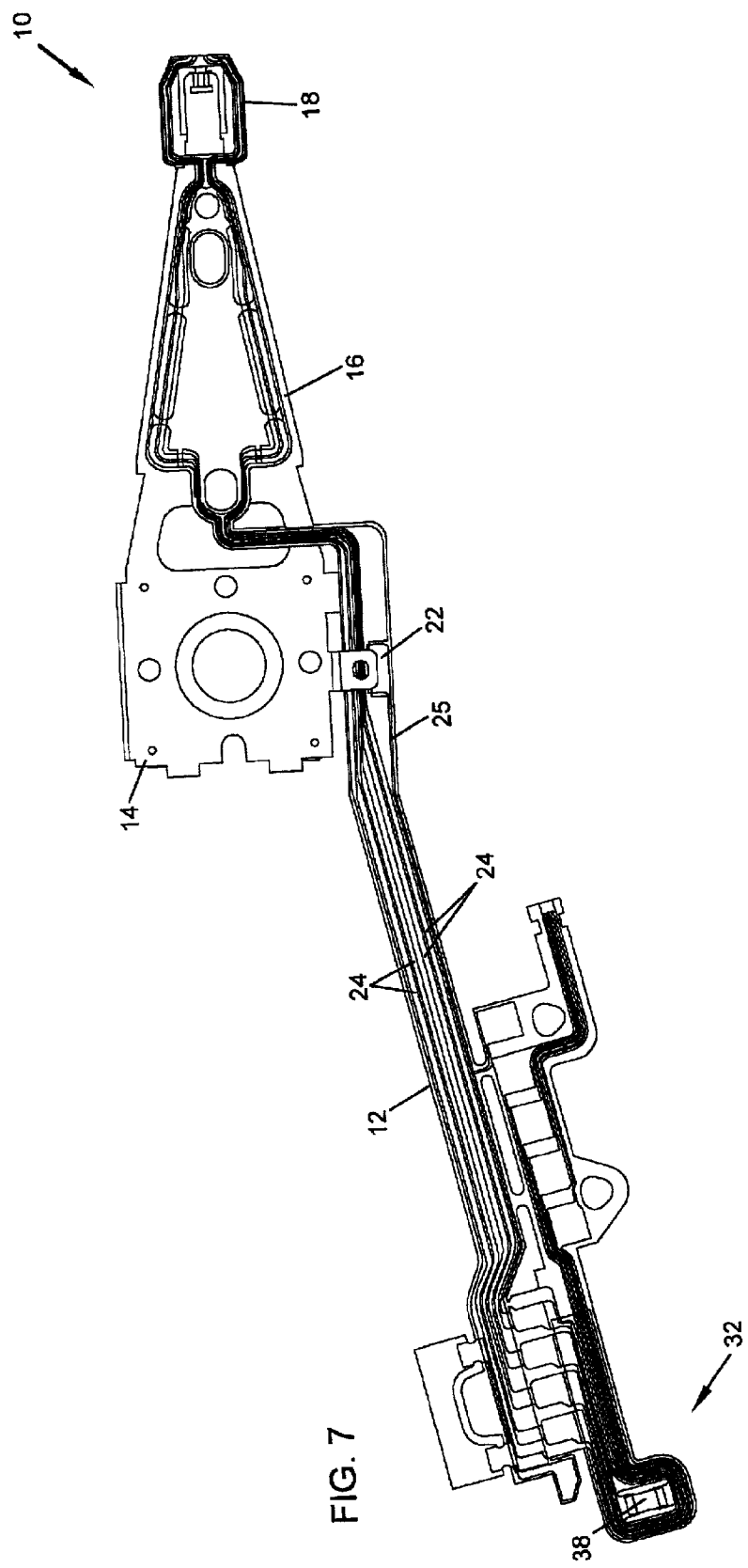
FIG. 7 is top plan view of a head gimbal assembly showing a bleed resistor connected to the transducer leads on the FOS breakaway tab in accordance with one exemplary embodiment.
Figure 8:
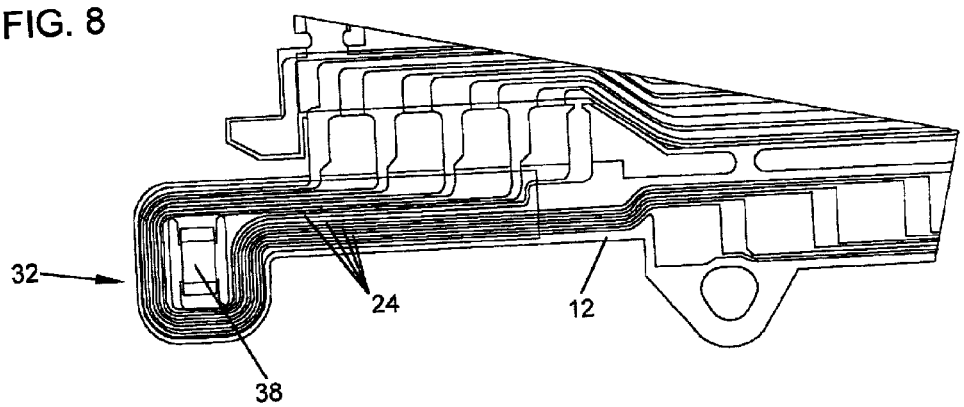
FIG. 8 is an enlarged top plan view of the type shown in FIG. 7.
Figure 9:
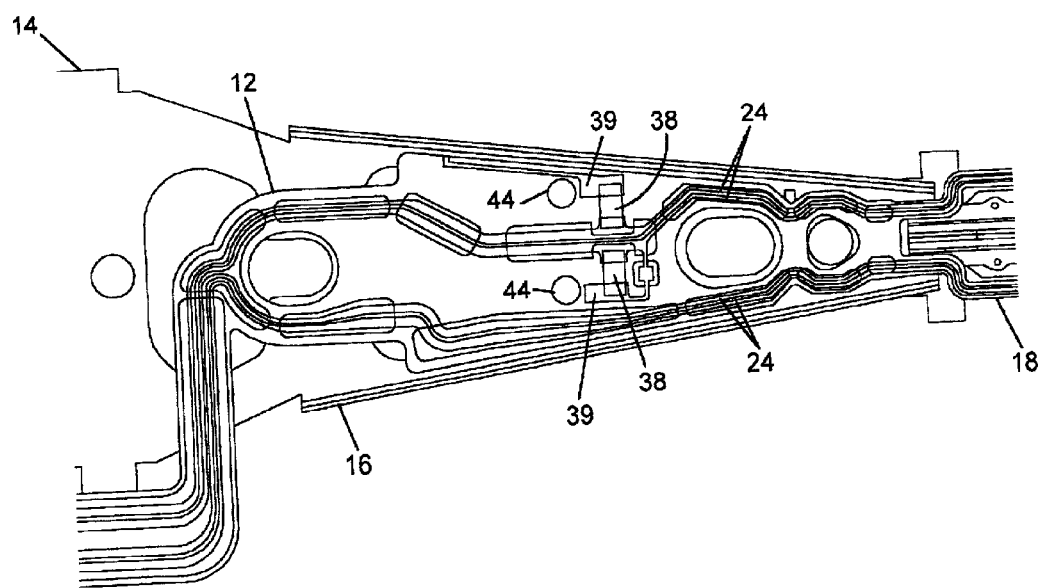
FIG. 9 is an enlarged top plan view showing bleed resistors placed between the transducer leads and ground on the FOS of the type shown in FIG. 7.

An alternate preferred embodiment of the head gimbal assembly 10 with bleed resistors is shown in FIGS. 7–9. FIG. 7 is a top plan view of head gimbal assembly 10 of the type shown in FIG. 1. FIG. 8 is an enlarged perspective view of FIG. 7. This embodiment further includes a FOS breakaway tab 32 which is located on the end of the FOS opposite the gimbal 18, a mounting plate 14, a load beam 16, and a magnetoresistive head (shown in FIG. 12). The magnetoresistive head includes a slider 20 (shown in FIG. 12) and transducer 26 (shown in FIGS. 13 and 14). The transducer 26 is fabricated onto a substrate, and then the substrate is attached to the slider. The FOS 12 extends from an actuator (not shown) and attaches to a portion of the mounting plate 14 on the tail tack 22 of the FOS 12, and further extends to, and is attached onto, the load beam 16. The gimbal 18 is attached to an end portion of the FOS 12. The gimbal 18 and an end portion of load beam 16 supports slider 20 in the vertical direction and also supplies a downward force to counteract the hydrodynamic lifting force developed by media (not shown) that move beneath slider 20. FIG. 7 also shows the transducer leads 24, which run the entire length of the FOS 12, to the gimbal 18 and eventually to the magnetoresistive head.

In this embodiment a discrete ceramic bleed resistor 38 is connected to the transducer leads 24 on the FOS breakaway tab 32. The resistor acts as a dissipative route between the transducer leads 24 and ground, and has a resistance in the range of 220 kΩ to 10 MΩ. The single resistor design provides ESD protection through the PCC connect and is torn off with the tester bond pads after testing and handling, thus no additional particle contamination. An alternative derivation of this embodiment is shown in FIG. 9, where bleed resistors 38 are connected to the FOS 12 near the gimbal 18. At least two bleed resistors 38 are electrically connected to transducer leads 24 and gold pads 39. Conductive epoxy is applied between the gold pad 39 and load beam 16 by a through hole 44. The bleed resistors 38 are tied to the grounded load beam 16 via the conductive epoxy. This provides protection from ESD during and after drive build, as the resistors are permanent on the FOS 12.

Figure 10:
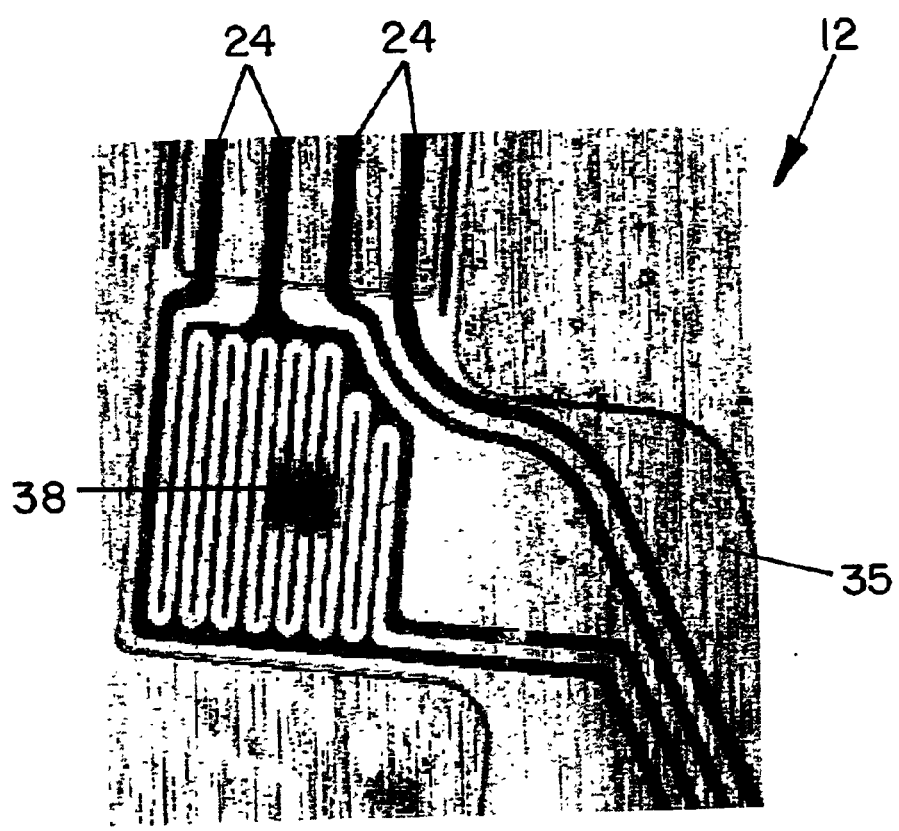
FIG. 10 is a top plan view of transducer leads of a head gimbal assembly showing bleed resistors in-between the transducer leads in accordance with another embodiment.
Figure 11:
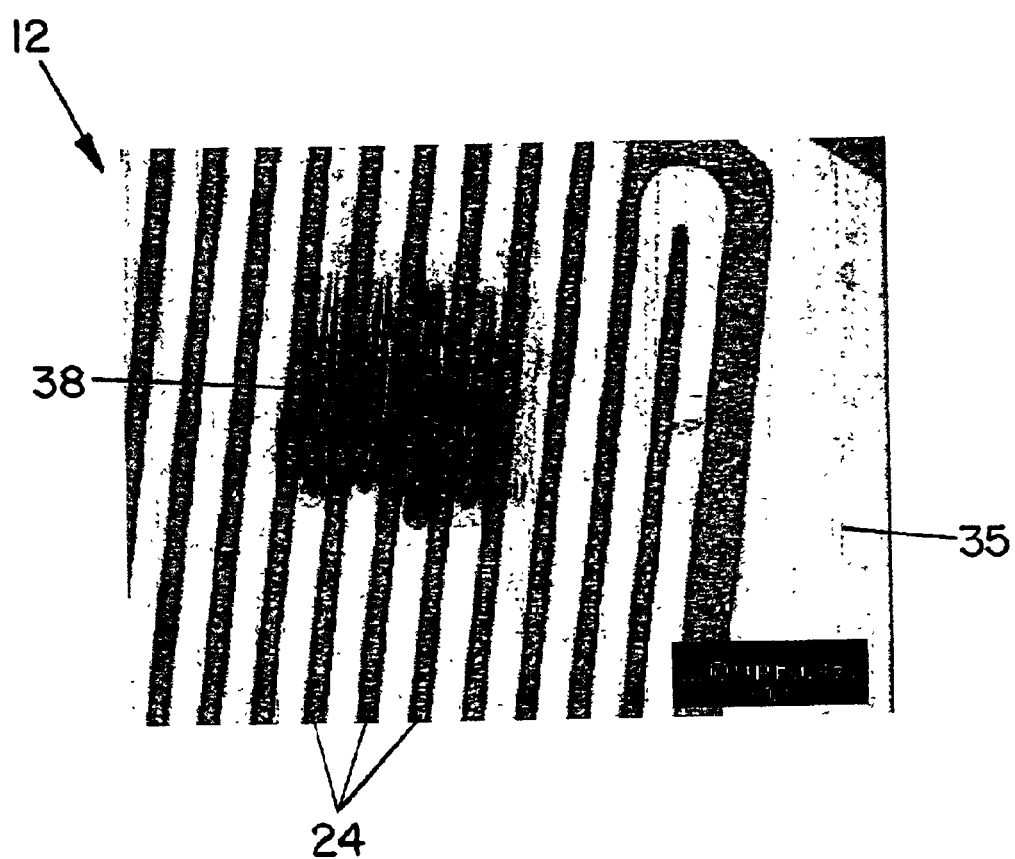
FIG. 11 is an enlarged perspective of the type shown in FIG. 10.

Another alternative embodiment of the head gimbal assembly 10 with ESD protection is shown in FIGS. 10 and 11. In this embodiment, the polyimide substrate 35 of FOS 12 is altered by a laser source, thereby carborizing and producing a bleed resistor 38. The desired resistance is tied to the time of laser application, power of the laser and size of the carbonized area. The resistance of bleed resistor 38 is preferably in the range of 220 kΩ to 10 MΩ. The bleed resistor 38 is in electrical contact with transducer leads 24 and acts as the dissipative route between the transducer leads 24 and ground.

Figure 12:
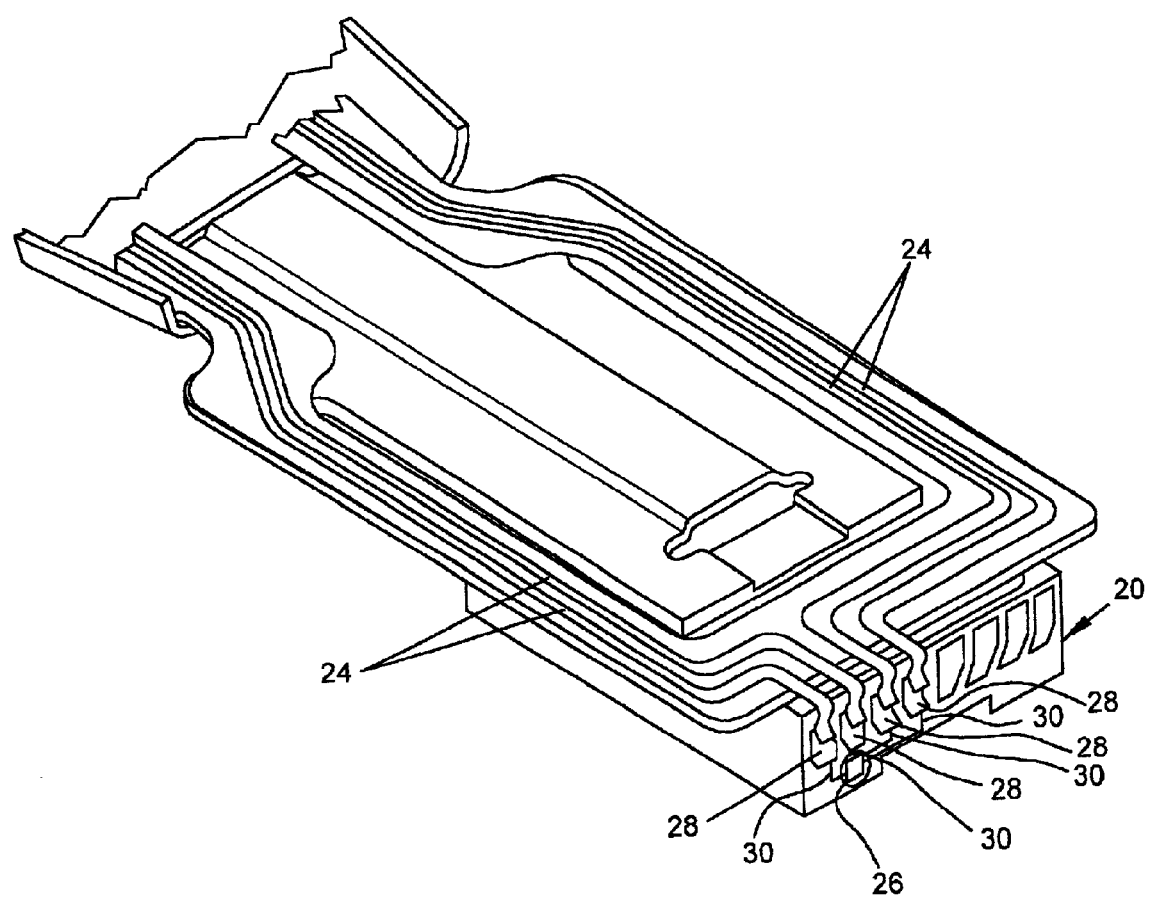
FIG. 12 is an enlarged perspective view of a slider attached to a gimbal.

FIG. 12 is an enlarged fragmentary perspective view of gimbal 18 near the end of the head gimbal assembly 10. As illustrated in FIG. 12, the transducer leads 24 run along the gimbal 18 to the contact pads 28, which are on the slider 20. Wires 30 electrically connect the transducer 26 to the bond pads 28. The transducer leads 24 are made of an electrically conductive material such as copper. The transducer leads 24 are fabricated or deposited upon a dielectric material such as a polyimide or a polyester material such as polyethyleneterephthalate (PET). The bond pads 28 are also formed from an electrically conductive material, such as copper, and are fabricated upon the slider 20.

Figure 13:
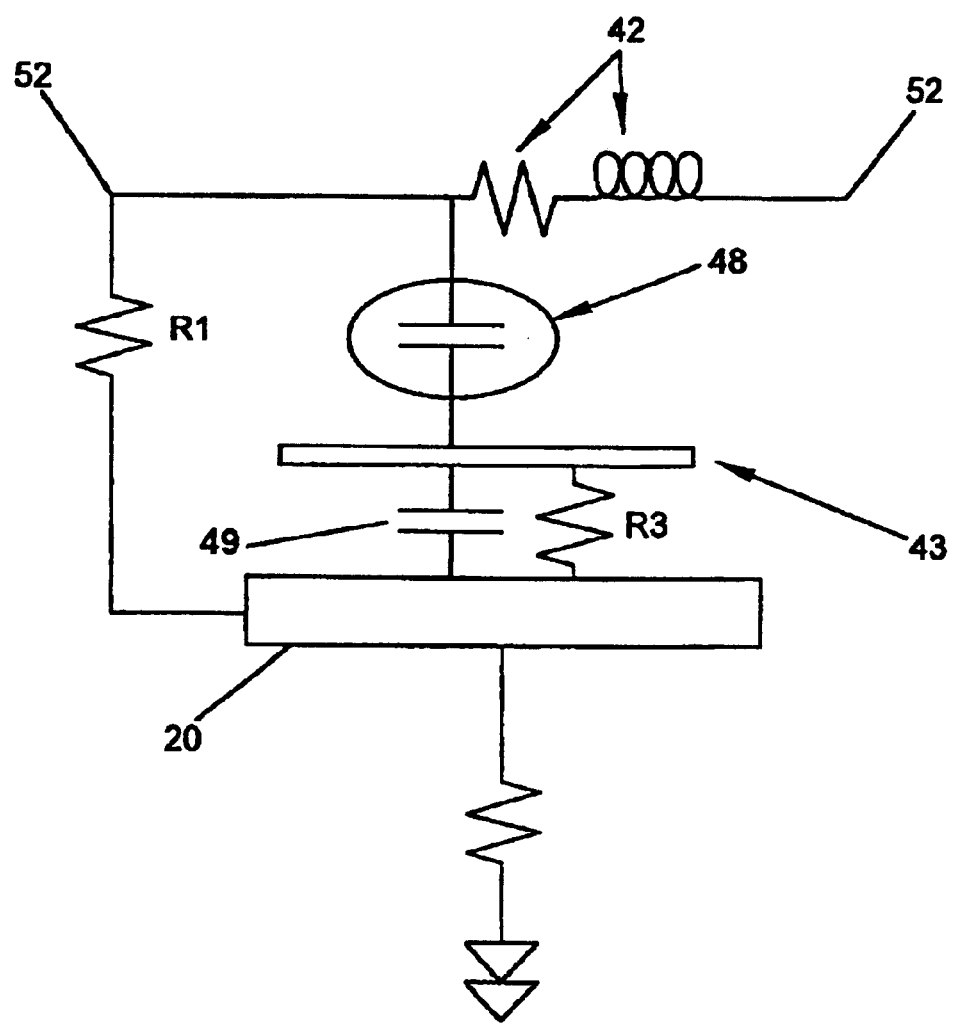
FIG. 13 is a simplified schematic diagram of a transducer including at least one bleed resistor in accordance with one another embodiment.
Figure 14:
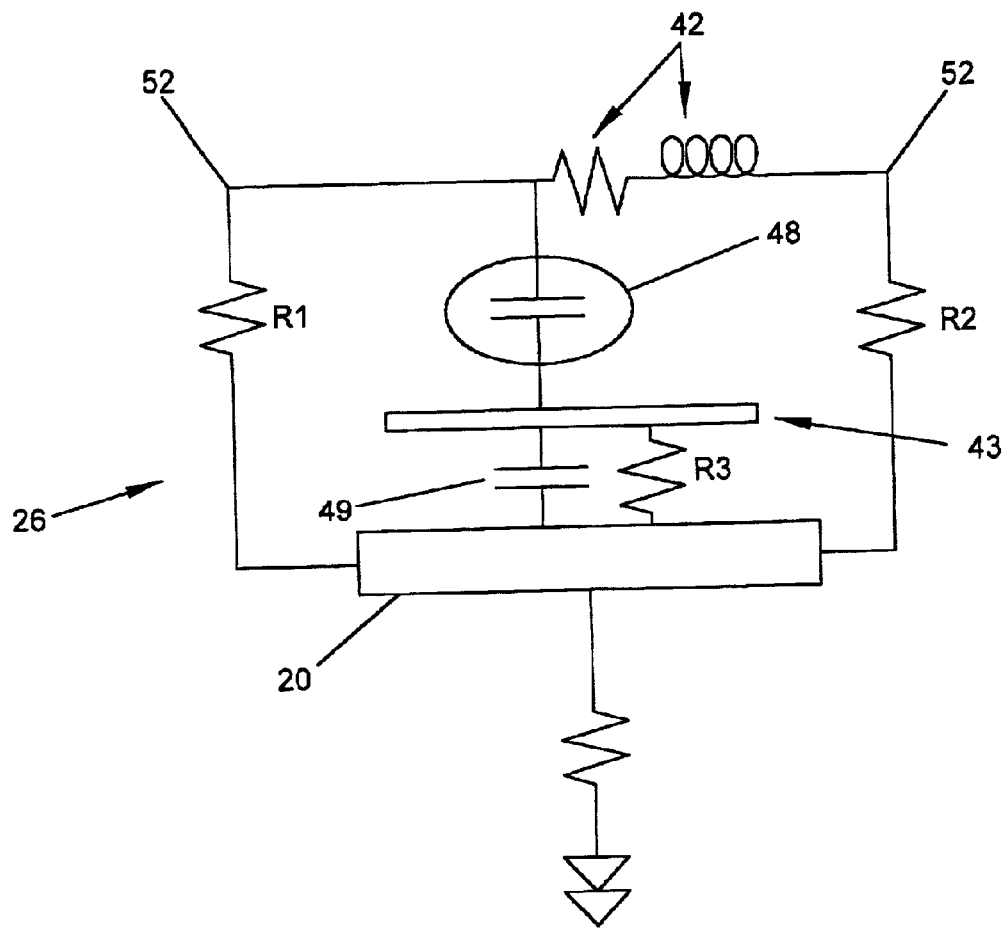
FIG. 14 is a simplified schematic diagram of a transducer including at least two bleed resistors, of the type shown in FIG. 13.
Figure 15:
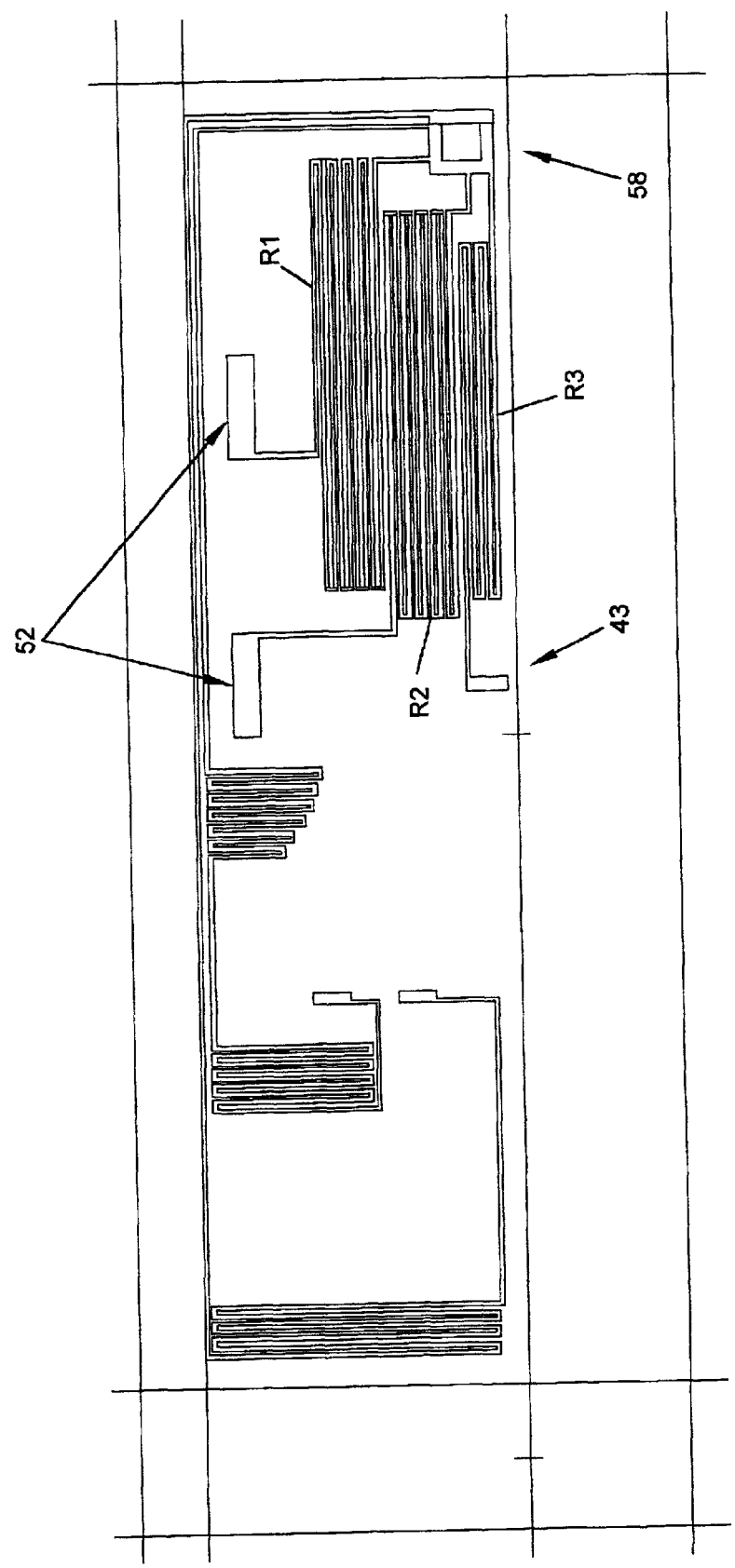
FIG. 15 is a top plan view of a layer in the magnetoresistive transducer of FIG. 13 in which the bleed resistors could be patterned.

FIGS. 13–15 illustrate an alternative embodiment for ESD protection in the magnetoresistive head of head gimbal assembly 10. FIGS. 13 and 14 show a simplified schematic of a magnetoresistive head, which includes the slider 20 and transducer 26. The transducer 26 is fabricated into a substrate or slider (not shown). The transducer 26 includes a writer element 42, a read element (not shown), and a magnetic shield 43. Transducer 26 further includes parasitic capacitors 48 and 49 between writer coil 42 and the magnetic shield 43 and between magnetic shield 43 and slider 20, respectively. Magnetic shield 43, which may also serve as a pole, is provided to shield stray magnetic flux generated by writer element 42. Writer bleed resistors $R_1$, $R_2$ and $R_3$ are fabricated simultaneously with reader bleed resistors, to offer minimal process content increase. Reader bleed resistors are shown and described in U.S. Pat. application Ser. No. 09/824,528, filed Apr. 2, 2001, by Tabat et al, entitled "MAGNETIC TRANSDUCERS WITH INTEGRATED CHARGE BLEED RESISTORS," and is incorporated by reference herein. FIG. 13 illustrates bleed resistor $R_1$ electrically coupled to writer element 42 and slider 20. Bleed resistor $R_1$ provides a discharge path from the writer element 42, which will reduce or balance any charge build-up. Similarly, bleed resistor $R_3$ provides a discharge path between shield 43 and the slider 20.

FIG. 14 illustrates bleed resistors $R_1$ and $R_2$ coupled onto either side of the writer element 42 and to the slider 20. Bleed resistors $R_1$ and $R_2$ couple to the same physical location on the slider 20, such that they are effectively coupled together and provide a discharge path across the writer element 42. The use of $R_2$ in addition to $R_1$ allows for reduced write signal degradation owing to these resistors. Similarly, a bleed resistor $R_3$ provides a discharge path between shield 43 and the slider 20.

Via 58 provides an electrical connection between the bleed resistors ($R_1$, $R_2$, and $R_3$) and slider 20, which is more fully illustrated in FIG. 15. A nominal value in the range of 10 k$\Omega$ to 1 G$\Omega$ is targeted for the writer bleed resistors $R_1$, $R_2$ and $R_3$.

FIG. 15 is a top plan view of transducer 26 showing connect coil contacts 52, which provide electrical connection to the writer element 42 as shown in FIG. 12. In FIG. 13 the read element has not yet been deposited. The bleed resistor terminals, at the ends of the resistors, themselves can be fabricated using the bottom shield seed layer material. The bleed resistors are buried under an insulating layer such as alumna, used for back fill during the fabrication process and chemical-mechanical-planarization (CMP) of the substrate prior to fabrication of read element. Bleed resistors $R_1$, $R_2$ and $R_3$ are shown as wire leads deposited on the substrate of slider 20, which provide electrical connections in accordance with the present invention between coil contacts 52 and a via 58 and between shield 43 and a via 58. Via 58 provides an electrical connection from a top surface of transducer 26 and slider 20. Slider 20 is connected to load beam 16 and load beam 16 is connected to ground.

The presence of the writer bleed resistors $R_1$, $R_2$ and $R_3$ should offer improvements in wafer manufacturing process in various ways, as charge can be bled from the wafer to the chuck mechanism in process tools. In plasma process tools, such bleeding of charge is known to reduce ESD risk. Also, in plasma processing, the presence of unbalanced charge drives variation during pattern transfer. In plating tools, the presence of an extra electrical contact to the substrate can provide greater uniformity.

Following wafer processing, the writer bleed resistors will offer additional protection beyond what reader bleed resistors may offer. The additional protection will occur during bar, slider, head gimbal assembly, head stack assembly, drive production and drive operation. The expected improvement during processing should be in yield. Because ESD damaged parts may not be suitably screened for, improvements in performance may also be possible. Any additional electrical elements integrated into the head, such as bleed resistors, need to be confirmed to not adversely affect drive performance, however no significant adverse effects have been seen experimentally or have been predicted in models.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A head gimbal assembly comprising:
   a load beam;
   a slider supported by the load beam;
   a transducer provided on the slider and including a read element and a write element; and
   a flex on suspension positioned on the load beam, wherein the flex on suspension comprises:
      a resistive polymer substrate that has a resistance between 220 k$\Omega$ to 10 M$\Omega$; and
      a plurality of transducer leads mounted on a length of the flex on suspension and electrically connected to the transducer;
   wherein the substrate acts as a bleed resistor electrically connected to the read element and the write element of the transducer.

2. The head gimbal assembly of claim 1, wherein the plurality of transducer leads are mounted on an entire length of said flex on suspension.

3. The head gimbal assembly of claim 2, said flex on suspension further including a tail tack, wherein one of said plurality of transducer leads is a ground lead, said ground lead is connected to said tail tack and said tail tack is connected to ground.

4. A head gimbal assembly comprising:
   a load beam;
   a slider supported by the load beam;
   a transducer provided on the slider and including a read element and a write element; and
   a flex on suspension provided on the load beam, wherein said flex on suspension comprises:
      a breakaway tab positioned on an end of the flex on suspension;
      a plurality of transducer leads mounted on an entire length of said flex on suspension and electrically connected to the transducer; and
      a resistive polymer substrate that has a resistance between 220 k$\Omega$ to 10 M$\Omega$;
   wherein the substrate acts as a bleed resistor electrically connected to the read element and the write element of the transducer.

5. The head gimbal assembly of claim 4, said flex on suspension further including a tail tack, wherein one of said transducer leads is a ground lead, said ground lead is connected to said tail tack and said tail tack is connected to ground.

6. The head gimbal assembly of claim 4, wherein said load beam acts as a ground.

7. A head gimbal assembly comprising:
- a flex on suspension having a substrate, wherein the substrate is a resistive polymer having a resistance between 220 kΩ to 10 MΩ;
- a plurality of transducer leads on said substrate; and
- a polymer covercoat that acts as a bleed resistor positioned on at least a portion of said plurality of transducer leads.

8. The head gimbal assembly of claim 7, wherein said polymer covercoat has a resistance between 220 kΩ to 10 MΩ.

9. A head gimbal assembly comprising:
- a flex on suspension and a plurality of transducer, leads mounted on an entire length of said flex on suspension, wherein one of said transducer leads is a ground lead, and further wherein the flex on suspension includes a resistive polymer substrate having a resistance between 220 kΩ to 10 MΩ; and
- a polymer covercoat that acts as a bleed resistor in electrical communication with a portion of transducer leads.

10. The head gimbal assembly of claim 9, said flex on suspension further including a tail tack, wherein said ground lead is connected to said tail tack and said tail tack is connected to ground.

* * * * *